United States Patent
Neema et al.

(10) Patent No.: US 12,345,185 B2
(45) Date of Patent: Jul. 1, 2025

(54) VEHICLE EMISSIONS MANAGEMENT

(71) Applicant: Cummins Inc., Columbus, IN (US)

(72) Inventors: Kartavya Neema, Fremont, CA (US); Chinmay Rao, San Jose, CA (US); Rohit A. Zope, Columbus, IN (US); Gayatri Adi, Franklin, IN (US); Paul V. Moonjelly, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/561,812

(22) PCT Filed: May 18, 2022

(86) PCT No.: PCT/US2022/029788
§ 371 (c)(1),
(2) Date: Nov. 17, 2023

(87) PCT Pub. No.: WO2022/245911
PCT Pub. Date: Nov. 24, 2022

(65) Prior Publication Data
US 2024/0254909 A1    Aug. 1, 2024

Related U.S. Application Data

(60) Provisional application No. 63/190,075, filed on May 18, 2021.

(51) Int. Cl.
*F01N 11/00* (2006.01)
*F01N 9/00* (2006.01)
*F02D 41/14* (2006.01)

(52) U.S. Cl.
CPC .......... *F01N 11/002* (2013.01); *F01N 11/007* (2013.01); *F01N 9/005* (2013.01);
(Continued)

(58) Field of Classification Search
CPC combination set(s) only.
See application file for complete search history.

(56) References Cited

U.S. PATENT DOCUMENTS 5,899,189 A    5/1999   Adelsperger
6,304,812 B1  10/2001   Kolmanovsky et al.
(Continued)

OTHER PUBLICATIONS

International Search Report and Written Opinion for International patent application No. PCT/US2022/029788 filed May 18, 2022, mailed Sep. 12, 2022.
(Continued)

*Primary Examiner* — Binh Q Tran
(74) *Attorney, Agent, or Firm* — Faegre Drinker Biddle & Reath LLP

(57) ABSTRACT

Disclosed herein are devices, systems, and methods relating to balancing engine performance and engine emissions of an engine in a vehicle in real time. In an example, a method can include sensing operation data indicative of an engine response during a current engine operation. The current ending operation can include a supervisory control of engine emissions. The method can include evaluating a response model to determine engine performance deviation data corresponding to an expected baseline engine performance and an expected current engine performance at the current engine operation. This evaluation can be performed via controller. This evaluation can be based on the operation data. The method can include generating and setting a performance constraint in response to evaluating the response model. The performance constraint can be set such that the engine performance deviation data is maintained at a controls objective that inhibits deterioration of the engine performance over time.

17 Claims, 8 Drawing Sheets

(52) U.S. Cl.
CPC .. *F01N 2900/04* (2013.01); *F01N 2900/0402* (2013.01); *F01N 2900/0412* (2013.01); *F01N 2900/0414* (2013.01); *F01N 2900/0418* (2013.01); *F01N 2900/0422* (2013.01); *F01N 2900/0601* (2013.01); *F01N 2900/08* (2013.01); *F01N 2900/14* (2013.01); *F01N 2900/1402* (2013.01); *F01N 2900/1404* (2013.01); *F01N 2900/16* (2013.01); *F02D 2041/1423* (2013.01); *F02D 2041/143* (2013.01); *F02D 2041/1433* (2013.01); *F02D 2041/1437* (2013.01)

(56) References Cited

U.S. PATENT DOCUMENTS

| | | | |
|---|---|---|---|
| 6,422,219 | B1 | 7/2002 | Savonen |
| 7,281,518 | B1 | 10/2007 | Allain et al. |
| 7,469,177 | B2 | 12/2008 | Samad et al. |
| 8,156,729 | B2 | 4/2012 | Sun |
| 9,146,545 | B2 | 9/2015 | Stewart |
| 9,328,674 | B2 | 5/2016 | Geveci et al. |
| 9,752,480 | B2 | 9/2017 | Bergh et al. |
| 9,909,517 | B2 | 3/2018 | Kothandaraman et al. |
| 2004/0244364 | A1 | 12/2004 | Makki |
| 2006/0042461 | A1 | 3/2006 | Boyden |
| 2013/0066512 | A1* | 3/2013 | Willard ............... G07C 5/0808 701/29.1 |
| 2013/0199282 | A1 | 8/2013 | Robertson |
| 2014/0007559 | A1* | 1/2014 | Janssen .................. F01N 11/00 60/276 |
| 2015/0204258 | A1* | 7/2015 | Kumar .................. F01N 11/007 60/274 |
| 2016/0102626 | A1* | 4/2016 | Johansson ........... F02D 41/2422 701/115 |
| 2016/0169077 | A1* | 6/2016 | Srinivasan .............. F01N 3/101 60/285 |
| 2017/0120915 | A1 | 5/2017 | David et al. |
| 2017/0370804 | A1* | 12/2017 | Chen .................... G01M 15/11 |
| 2018/0216558 | A1* | 8/2018 | Buchholz ............... F02D 41/30 |
| 2018/0266340 | A1 | 9/2018 | Garimella et al. |
| 2020/0151291 | A1* | 5/2020 | Bhattacharyya ....... G01C 21/20 |
| 2022/0364519 | A1* | 11/2022 | Charbonnel ........ F02D 41/1448 |
| 2022/0397070 | A1* | 12/2022 | Weiss ................. F02D 41/0065 |

OTHER PUBLICATIONS

International Preliminary Report on Patentability received for PCT Patent Application No. PCT/US2022/029788, mailed on Nov. 30, 2023, 11 pages.

* cited by examiner

VEHICLE EMISSIONS MANAGEMENT

CROSS-REFERENCE TO RELATED APPLICATIONS

This application claims priority to and is a U.S. national stage application of International Patent Application No. PCT/US2022/029788, filed May 18, 2022, which claims priority to U.S. Provisional Application No. 63/190,075, filed on May 18, 2021, the disclosures of which are hereby incorporated herein by reference in their entirety.

FIELD OF THE DISCLOSURE

This disclosure relates to controlling emissions from an internal combustion engine system, and more particularly to apparatus, systems, and methods for balancing engine performance and emissions using engine controls and an exhaust aftertreatment system BACKGROUND Diesel engines produce a number of combustion products including particulates, hydrocarbons ("HC"), carbon monoxide ("CO"), oxides of nitrogen ("NOx"), and oxides of sulfur ("SOx"). Regulations on future diesel engines will likely require exhaust aftertreatment systems to further reduce emissions of these and other products of combustion. Such exhaust aftertreatment systems may include a number of components including catalytic conversion components, particulate filters, and others which can be operated in a variety of modes. In addition to base modes of operation, from time to time, it may be necessary to implement regeneration modes which regenerate various components of exhaust aftertreatment systems. There is a need for apparatuses, systems, and methods of flexible fuel injection in the foregoing and other modes to comply with emissions regulations.

NOx emissions from diesel engines pose a number of health and environmental concerns. Once in the atmosphere, NOx reacts with volatile organic compounds or hydrocarbons in the presence of sunlight to form ozone, leading to smog formation. Ozone is corrosive and contributes to many pulmonary function problems, for instance. Due to their damaging effects, governmental agencies have imposed increasingly stringent restrictions for NOx as well as particulate matter ("PM") emissions. At least two mechanisms can be implemented to comply with emission control regulations: manipulation of engine operating characteristics and implementation of after-treatment control technologies.

In general, manipulating engine operating characteristics to lower NOx emissions can be accomplished by lowering the intake temperature, reducing power output, retarding the injector timing, reducing the coolant temperature, and/or reducing the combustion temperature. Reducing NOx by manipulating engine operation generally reduces fuel efficiency. Moreover, mere manipulation of engine operation may not sufficiently reduce the amount of NOx to mandated levels. As a result, after-treatment systems also need to be implemented. In general, catalysts are used to treat engine exhaust and convert pollutants, such as carbon monoxide, hydrocarbons, as well as NOx, into harmless gases. In particular, to reduce NOx emissions, diesel engines on vehicles can employ a catalytic system known as a urea-based selective catalytic reduction (SCR) system.

SUMMARY

Disclosed herein are devices, systems, and methods of balancing engine performance and engine emissions of an engine in a vehicle in real time. The method can include sensing operation data indicative of an engine response during a current engine operation. The current ending operation can optionally include a supervisory control of engine emissions. The method can include evaluating a response model to determine engine performance deviation data corresponding to an expected baseline engine performance and an expected current engine performance at the current engine operation. This evaluation can be performed via controller. This evaluation can be based on the operation data. The method can include setting a performance constraint in response to evaluating the response model. The performance constraint can be set such that the engine performance deviation data is maintained at a controls objective that inhibits deterioration of the engine performance over time. In examples, the performance constraint can be sent to a supervisory control structure, which can manage engine performance deviation and emissions over the lifecycle of the engine.

In examples, the supervisory control is optionally based on operating points along a fuel-emissions tradeoff curve. This curve can optionally include calibrations for a low emissions operating point, a baseline operating point, and a best fueling operating point or some subset or extension thereof. The operating points can optionally correspond to a set of rail pressure and air handling references for the engine. In examples, the response model can optionally be indicative of engine performance for transient and steady state operation at each operating point for each of the calibrations. The controller is optionally configured to interpolate additional operating points between at least two of the calibrations.

In examples, the method can optionally include sending the performance constraint to a supervisory control structure. The supervisory control structure can optionally be configured to determine optimized fuel system and air handling references based at least on the performance constraint. In examples, the method can include optimizing the engine performance prioritizing the performance constraint.

In examples, the engine performance deviation data can be fuel rate deviation data. In this regard, the performance constraint can be a fuel rate constraint. In examples, the engine performance deviation data can be brake specific fuel consumption (BSFC) deviation data. In this regard, the performance constraint can be a BSFC constraint. In examples, the controls objective can be either a performance range such that the engine performance is maintained within the performance range or a performance threshold such that the engine performance is maintained within the performance threshold. In examples, the controls objective is a percentage change in the engine performance deviation data.

In examples, the engine performance deviation data can optionally be equal to a change in engine performance divided by the expected baseline engine performance. In this regard, the change in engine performance can optionally be equal to the expected current engine performance minus the expected baseline engine performance.

Disclosed herein are methods of determining an engine performance of an engine in a vehicle. The method can include sensing operation data indicative of an engine response during a current engine operation. The method can include determining an evaluation window comprising a length of time over which the engine performance is to be evaluated. The method can include evaluating a response model to determine a current engine performance at the current engine operation. In examples, this evaluation can be performed via a controller. In examples, this evaluation can be based on each of the operation data and the evaluation window. The method can include setting a performance constraint in response to evaluating the response model. In examples, the performance constraint can be set such that the current engine performance is maintained at a controls objective that inhibits reduced engine performance.

In examples, the length of time of the evaluation window can optionally be adjustable over time based on engine operating conditions. In examples, the length of time of the evaluation window is made longer than a nominal length when the engine operating conditions include low fueling regions on an engine torque curve. In examples, the length of time of the evaluation window is made shorter than the nominal length when the engine operating conditions include high fueling regions on the engine torque curve.

In examples, the evaluation window can optionally have an upper limit and a lower limit. In this regard, at least one of the upper and lower limits can optionally be based on one or more of regulatory requirements and regulatory cycles. In examples, the lower limit optionally may not change across singular modes of steady state regulatory cycles.

Additional features and advantages of the present disclosure will become apparent to those skilled in the art upon consideration of the following detailed description of the illustrative embodiments exemplifying the disclosure as presently perceived.

The present disclosure provides a number of advantages. For example, the emissions management system may optimize emissions reduction by managing multiple parameters of the engine. In embodiments, the emissions management system has an overall reduced system out emission because exhaust flow rates are reduced while catalyst temperature reaches a high-efficiency threshold. Plus, the present disclosure may be used across a wide range of application without significantly contributing to their costs and complexity.

BRIEF DESCRIPTION OF THE DRAWINGS

The above-mentioned and other features and advantages of this disclosure, and the manner of obtaining them, will become more apparent, and will be better understood by reference to the following description of the exemplary embodiments taken in conjunction with the accompanying drawings, wherein.

Figure 1A:
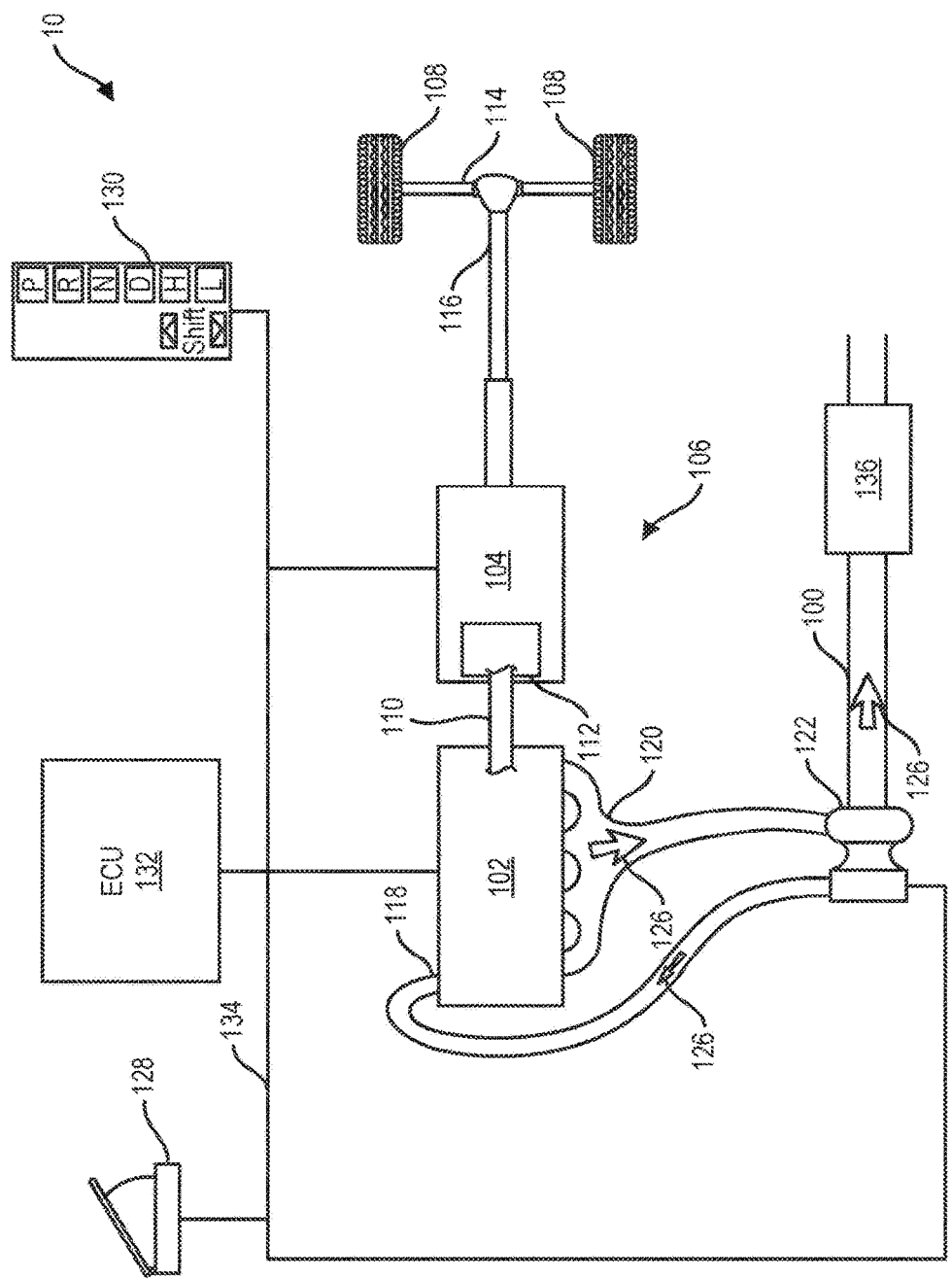
FIG. 1A is a schematic block diagram illustrating an embodiment of a powertrain for a vehicle according to aspects of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings. It is not beyond the scope of this disclosure to have a number (e.g., all) the features in a given embodiment to be used across all embodiments.

Figure 1B:
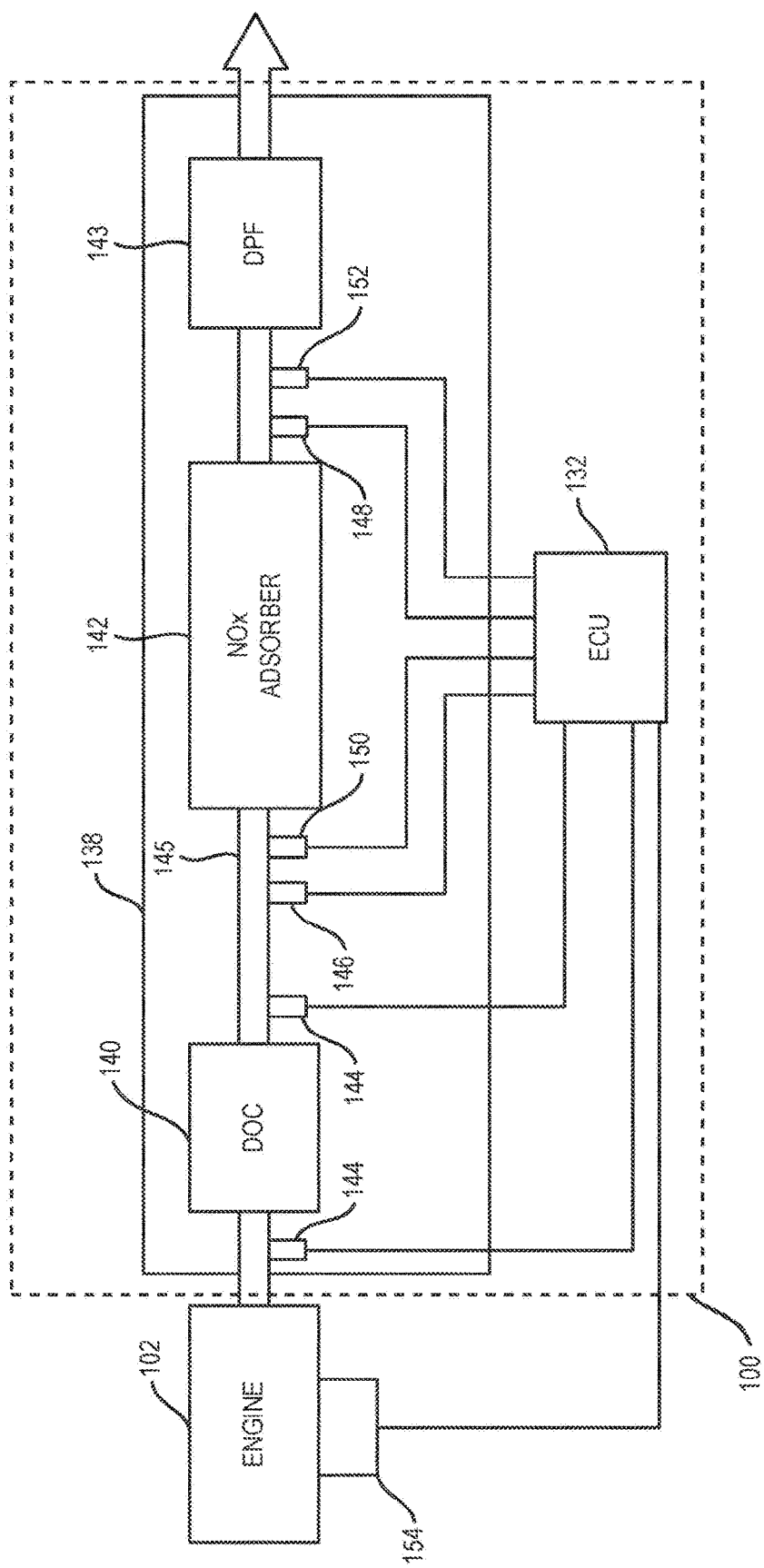
FIG. 1B is a schematic of an integrated engine-exhaust aftertreatment system operatively coupled with a controller according to aspects of the present disclosure.

As backdrop, with reference to FIGS. 1A and 1B, the following discussion relates to various devices and systems upon which aspects of the present disclosure can be employed. FIG. 1A shows a schematic block diagram illustrating an embodiment of a powertrain for a vehicle 10 according to aspects of the present disclosure. FIG. 1B shows a schematic of an integrated engine-exhaust aftertreatment system 100 (hereinafter "aftertreatment system 100"). Aspects of the present disclosure will be discussed below within the context of a vehicle 10 with a diesel engine 102 for brevity and clarity. Such discussion is not intended to be limiting. In fact, one skilled in the art will appreciate that many logical extensions of this discussion will be useful within other contexts. Such contemplations are considered well within the scope of this disclosure.

Example systems employing aspects of the present disclosure can include a vehicle 10. The vehicle 10 may be an automobile, truck, bus, or other type of internal combustion powered vehicle 10. With reference to FIG. 1A, the vehicle 10 may comprise an internal combustion engine 102 coupled to a transmission 104. The internal combustion engine 102 (hereinafter "engine 102") may be of the four-stroke diesel-fueled type with Compression Ignition (CI). Alternatively, the engine 102 may be a different type of engine 102 such as, but not limited to, two stroke diesel-fueled types, a Spark Ignition (SI) type of engine 102, or a gaseous or fueled type. The engine 102 and the transmission 104, along with other components, are commonly referred to as a "drivetrain 106."

In one embodiment, the drivetrain 106 further comprises a pair of rotating propulsion members in the form of ground engaging wheels 108. An output shaft 110 of the engine 102 couples the engine 102 to a torque converter 112 of the transmission 104. The transmission 104 may comprise a manual, automatic, or automated manual transmission 104. A propeller shaft 114 is rotatably coupled to a drive shaft 116 of the transmission 104 and transfers torque from the engine 102 to the wheels 108 in order to propel the vehicle 10. The present description of the drivetrain 106 is directed to the primary components of the drivetrain 106 with standard components not being specifically described as the standard components would be known to those skilled in the art.

The engine 102, in an example, includes an intake manifold 118, an exhaust manifold 120, and is operatively connected to a turbocharger 122 and an aftertreatment system 100. Exhaust and combustion gasses generally flow in the directions indicated by arrows 126. As is well known to those skilled in the art, exhaust gasses are exhausted from the engine 102 into the exhaust manifold 120 and routed through the turbocharger 122 to the aftertreatment system 100. The turbocharger 122 utilizes the flow of exhaust gasses to accelerate the flow of combustion gasses through the intake manifold 118 to subsequently increase the performance of the engine 102. Alternatively, the vehicle 10 may not implement a turbocharger 122.

A driver utilizes a throttle 128, a gear selection module 130, and a plurality of input devices (not shown), such as a steering wheel, while driving the vehicle 10. In an example, a controller 132 (such as the engine control unit 132 (hereinafter ECU 132)) is configured to receive control data from the plurality of input devices, throttle 128, and gear selection module 130. The ECU 132 may also be configured to interpret the data and send command signals to the engine 102. One skilled in the art will recognize that the ECU 132 is also capable of commanding a plurality of systems, such as a fueling system.

In an example, the ECU 132 is configured to communicate with the various systems of the vehicle 10 over a data network 134. The data network 134 may be a common data path over which the throttle 128 and gear selection module 130 transmit commands. Additionally, the data network 134 may comprise a unique wired or wireless connection between each of the plurality of devices (e.g., throttle 128, gear selection module 130, and ECU 132). Alternatively, each device (e.g., throttle 128, gear selection module 130, and ECU 132) may have a separate connection to each of the other devices. The vehicle 10 may also include a unitary housing 136 comprising a particulate trap system (e.g., an aftertreatment subsystem 138, FIG. 1B) for reducing particulate emissions from the engine 102 coupled to the aftertreatment system 100 and located downstream from the turbocharger 122. As used herein, the term "downstream" refers to in the direction of or a location nearer to an exhaust outlet such as a tailpipe (not shown).

With reference to FIG. 1B, there is illustrated a schematic of aftertreatment subsystem 138 operatively coupled with an ECU 132. The aftertreatment subsystem 138 includes a diesel oxidation catalyst unit 140 (e.g., DOC 140), such as a close coupled catalyst or a semi-close coupled catalyst, a NOx adsorber 142 or lean NOx trap 142, and a diesel particulate filter 143 (e.g., DPF 143), each of which can be coupled in flow series (e.g., via exhaust conduit 145) to receive and treat exhaust output from engine 102. As exhaust gas from the engine 102 flows through the DOC 140, it engages a catalyst therein such that substances such as CO, gaseous HC, and liquid HC (unburned fuel and oil) are oxidized and converted to carbon dioxide and water when the catalyst is heated to a desired temperature. The NOx adsorber 142 can adsorb NOx and SOx emitted from engine 102 to reduce their emission into the atmosphere. The DPF 143 can be used to capture unwanted diesel PM from the flow of exhaust gas exiting the engine 102.

At least one temperature sensor 144 is connected with the DOC 140 (e.g., via exhaust conduit 145) for measuring the temperature of the exhaust gas as it enters the DOC 140. In other embodiments, two temperature sensors 144 are used, one at the entrance or upstream from the DOC 140 and another at the exit or downstream from the DOC 140. Information from temperature sensor(s) 144 is provided to ECU 132 and used to calculate the temperature of the DOC 140.

A first NOx temperature sensor 146 senses the temperature of flow entering or upstream of NOx adsorber 142 (e.g., via exhaust conduit 145) and provides temperature signals to ECU 132. A second NOx temperature sensor 148 senses the temperature of flow exiting or downstream of NOx adsorber 142 and provides temperature signals to ECU 132. NOx temperature sensors 146 and 148 are used to monitor the temperature of the flow of gas entering and exiting the NOx adsorber 142 and provide signals that are indicative of the temperature of the flow of exhaust gas to the ECU 132. An algorithm may then be used by the ECU 132 to determine the operating temperature of the NOx adsorber 142.

A first universal exhaust gas oxygen ("UEGO") sensor or lambda sensor 150 is positioned in fluid communication with the flow of exhaust gas entering or upstream from the NOx adsorber 142 and a second UEGO sensor 152 is positioned in fluid communication with the flow of exhaust gas exiting or downstream of the NOx adsorber 142. The UEGO sensors 150, 152 are connected with the ECU 132 and generate electric signals that are indicative of the amount of oxygen contained in the flow of exhaust gas. The UEGO sensors 150, 152 allow the ECU 132 to accurately monitor air-fuel ratios ("AFR") also over a wide range thereby allowing the ECU 132 to determine a lambda value associated with the exhaust gas entering and exiting the NOx adsorber 142.

Engine 102 includes a fuel injection system 154 that is operatively coupled to, and controlled by, the ECU 132. Fuel injection system 154 delivers fuel into the cylinders of the engine 102. Various types of fuel injection systems may be utilized in the present invention, including, but not limited to, pump-line-nozzle injection systems, unit injector and unit pump systems, common rail fuel injection systems and others. The timing of the fuel injection, the amount of fuel injected, the number and timing of injection pulses, are preferably controlled by fuel injection system 154 and/or the ECU 132.

ECU 132 executes software which includes a number of variables related to engine operation. In examples, for both steady state and transient operations, the software uses some or all the following operating conditions as variables: speed, torque, fuel system references, and air handling references.

With the above as backdrop, discussion now turns to methods that can be in the form of instructions that are executed by the ECU 132. Such instructions can use offline populated response models to determine instantaneous engine performance data, such as those related to fuel economy. These and other variables can be monitored and used to generate commands that influence engine operation. Such commands can include regulating engine cylinder fuel injection, exhaust gas recirculation, and the like. In further examples, the commands can include an air intake handling command, a fuel injection command, an exhaust gas recirculation ("EGR") system command, a turbine bypass valve command, and a compressor bypass valve command. The air intake handling command instructs the intake manifold 118 to regulate the amount of air entering the cylinders according to a commanded air intake flow rate. The fuel injection command instructs the fuel injector mechanisms to achieve desired fuel-related operating conditions, such as fuel injection rate, main injection timing, rail pressure, pilot fueling, pilot timing, post fueling, and post timing. The EGR system command instructs an EGR valve (not shown) to regulate the amount of EGR gas entering the cylinders according to a commanded EGR gas flow rate. The turbine bypass valve command instructs a bypass valve (not shown) to regulate the amount of exhaust flowing through a turbine (not shown)

of turbocharger 122 according to a commanded turbine exhaust flow rate. The compressor bypass valve command instructs the bypass valve to regulate the amount of air and EGR gas flowing through a compressor (not shown) of the turbocharger 122 according to a commanded compressor exhaust flow rate. In other implementations, the commands can include any of various other commands for controlling any of various other engine system components affecting the engine output and exhaust properties.

Figure 2A:
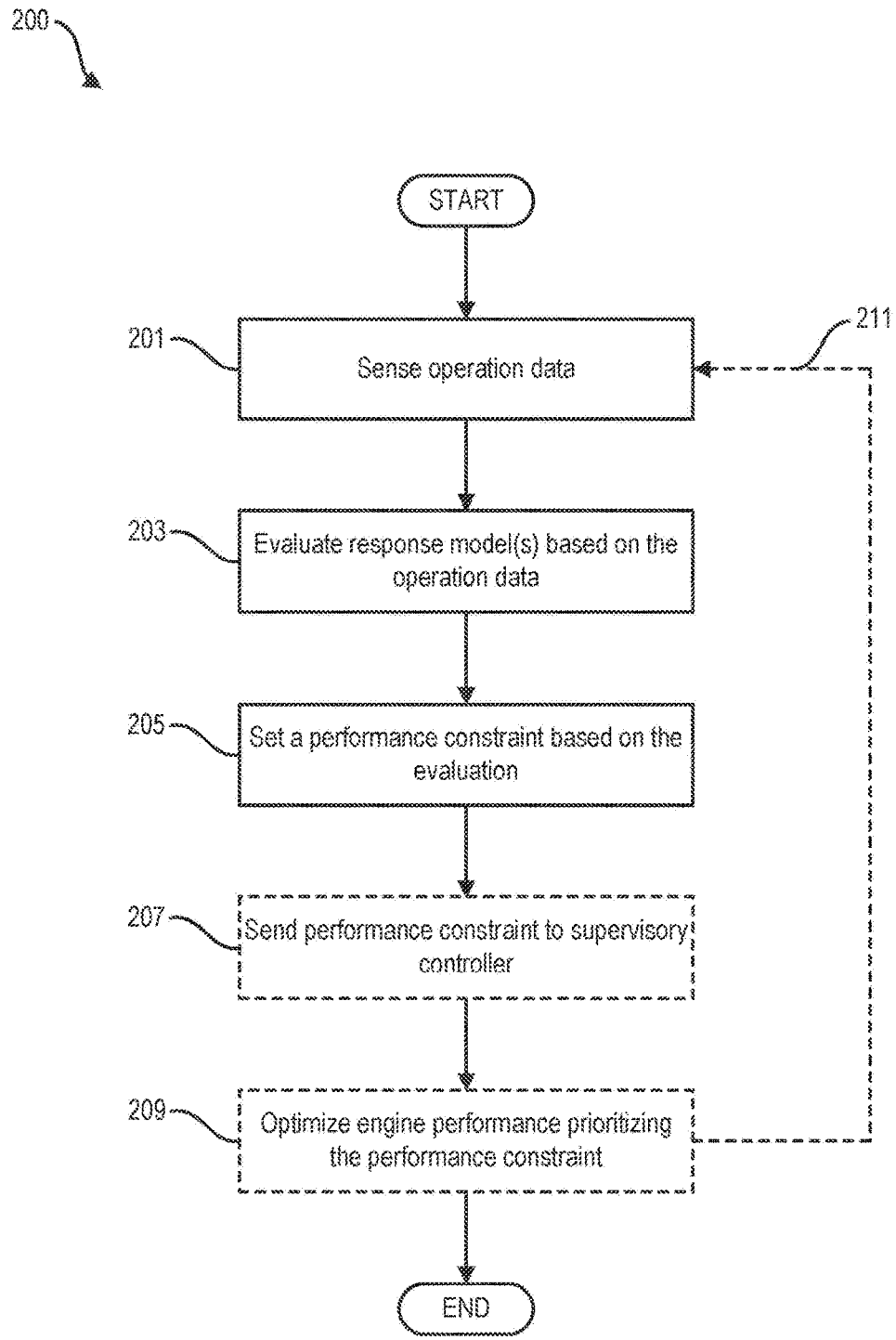
FIG. 2A is flowchart of a method for balancing emissions and fuel economy according to aspects of the present disclosure.

Disclosed devices, systems, and methods can be useful for balancing engine performance and engine emissions of an engine in a vehicle in real time. In an example shown in FIG. 2A, a method 200 can include sensing operation data indicative of an engine (e.g., engine 102, FIGS. 1A, 1B) response during a current engine operation at step 201. The current engine operation can include a supervisory control of engine emissions. At step 203, the method 200 can include evaluating a response model to determine engine performance deviation data corresponding to an expected baseline engine performance and an expected current engine performance at the current engine operation. This evaluation can be performed via controller. In examples, this evaluation can be used to generate a performance constraint. This evaluation can be based on the operation data. At step 205, the method 200 can include setting a performance constraint in response to evaluating the response model. The performance constraint can be set such that the engine performance deviation data is maintained at a controls objective that inhibits deterioration of the engine performance over time.

In examples, some steps of the method 200 are optional as indicated by the dashed line and can include optional feedback loops to repeat certain steps (e.g., for optimization and/or monitoring) where desired. The figure is not intended to limit the disclosure to the example illustrated therein. At step 207, the method 200 can include sending the performance constraint to a supervisory control structure that is configured to determine optimized fuel system and air handling references based at least on the performance constraint. At step 209, the method 200 can include optimizing the engine performance prioritizing the performance constraint. Feedback loop 211 is also contemplated. These steps are further discussed below with respect to FIG. 3, but the immediately following discussion provides further details relating to the method 200.

As used herein, response models can refer to models that can provide real-time estimations of engine-aftertreatment system response given engine operating conditions. Response models can be in the form of offline populated tables or graphs. These response models can be employed in a variety of manners but for purposes of brevity and clarity are discussed below in the context of fuel economy. For instance, as further described below, one or more response models can be used to determine real-time, instantaneous fuel economy and for emissions management (e.g., management of CO2) in a diesel engine-aftertreatment system over a lifetime of the vehicle as performance of the system generally deteriorates. In examples, response models can be used with window-based averages of their estimations to determine fuel economy for given speed and load demands, but for a baseline engine-aftertreatment system. In this regard, response models can be used to ensure that fuel economy of the engine stays consistent while the system is governed (e.g., via supervisory controls) to meet stringent tailpipe NOx emissions requirements. Tradeoffs between consistent fuel economy and consistent tailpipe NOx emissions are made so that NOx emissions management is not overprioritized possibly at a cost of reduced fuel economy and increased CO2 emissions.

Figure 2B:
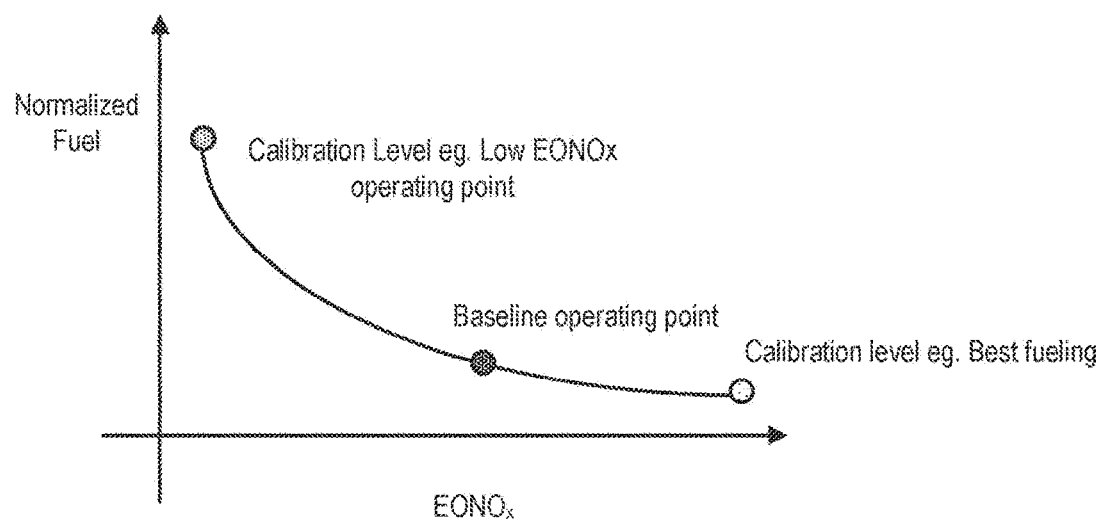
FIG. 2B is a diagram of operating point calibrations along a tradeoff curve according to aspects of the present disclosure.

Behavior of the engine-aftertreatment system can be governed by a supervisory control strategy that considers tradeoffs between emissions and fuel. In examples, the supervisory control is based on operating points along a fuel-emissions tradeoff curve, an example of which is FIG. 2B. For instance, as shown here, the fuel-emissions tradeoff curve correlates fuel and engine out NOx. Each operating point can correspond to a set of rail pressure and air handling references that result in a desired behavior for the system. This curve can include calibrations for a low emissions operating point, a baseline operating point, and a best fueling operating point or some subset or extension thereof. The operating points can correspond to a set of rail pressure and air handling references for the engine. The controller can decide which operating point to pick given a variety of inputs that describe the present status of the engine-aftertreatment system. In examples, the controller is configured to interpolate additional operating points between at least two of the calibrations. For instance, the controller may operate at an operation point between the low emissions operating point and the baseline operating point or between the baseline operating point and the best fueling operating point.

Figure 2C:
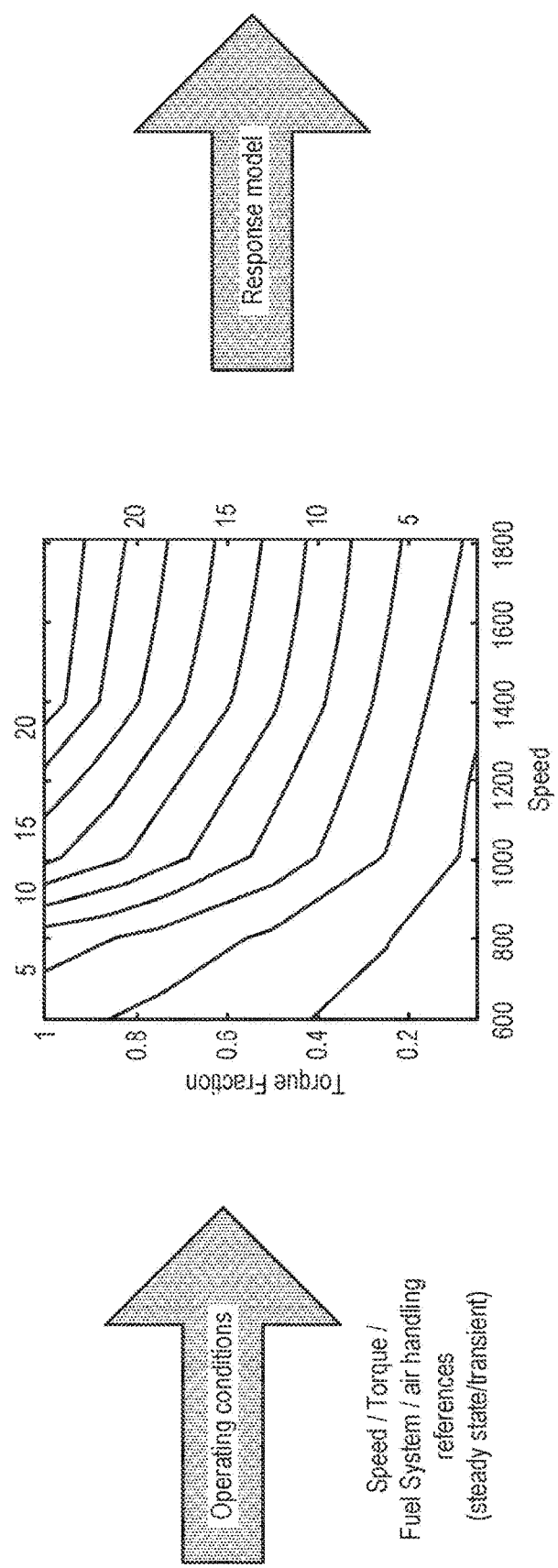
FIG. 2C is a diagram showing construction of engine response models for different operating parts according to aspects of the present disclosure.
Figure 2D:
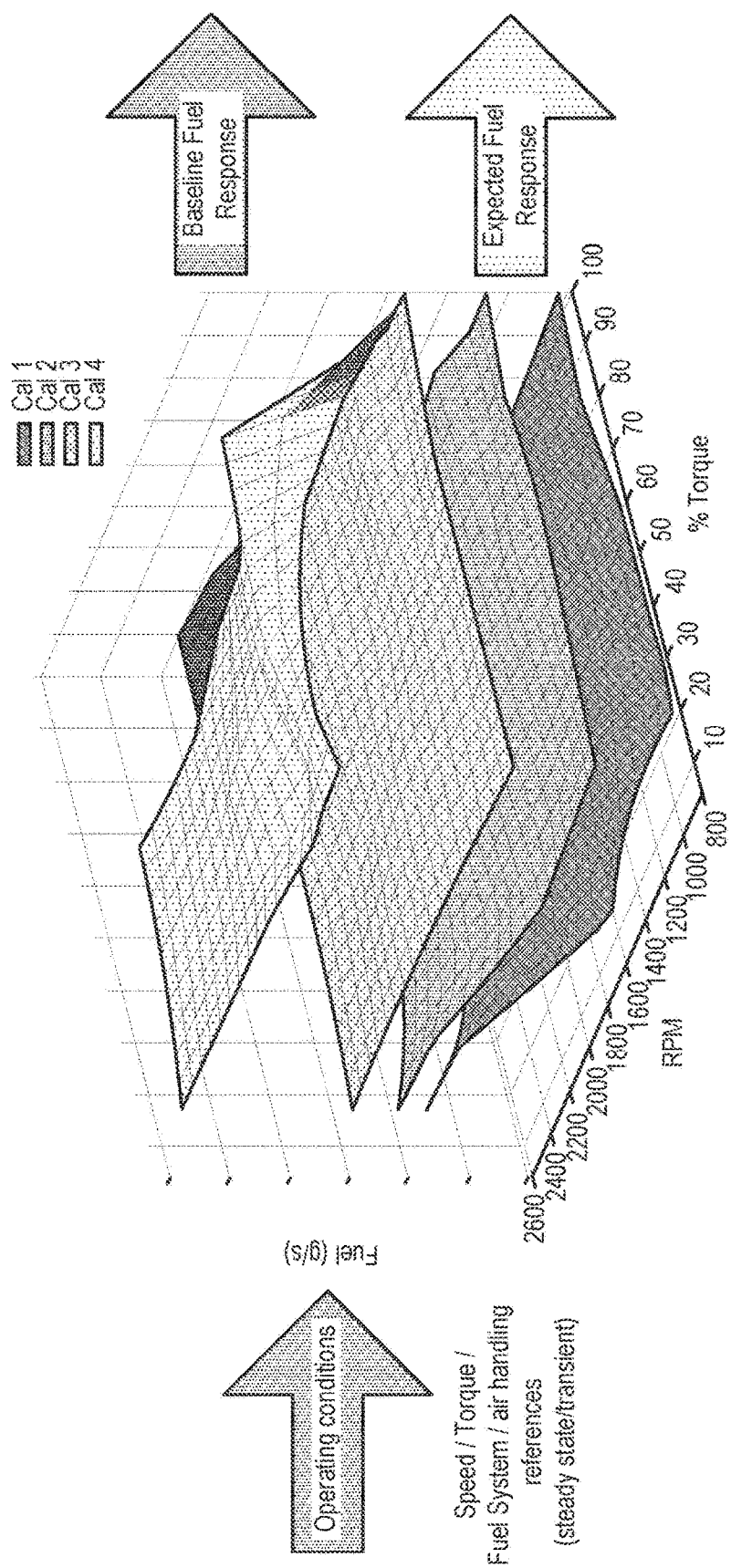
FIG. 2D is a diagram showing construction of responses from response models according to aspects of the present disclosure.

Expected engine behavior at certain operating points can be represented in response models, which can be evaluated to estimate engine response for given engine operation commands. For instance, as can be seen in FIG. 2C, response models can be generated for each of the operating points discussed above using engine operating conditions as input variables. In certain instances, one or more response models are stored in the controller. For example, the response models can be stored on the controller as prerecorded tables with expected values, which can be adjusted to be actual values over time as the system monitors certain parameters such as normalized fuel consumption and engine power. Input variables for the response models can include physical parameters of the engine, such as engine size, materials, and location on the vehicle, etc., and/or operating conditions, such as operating O2, charge flow, speed, torque, fuel system references, air handling references, etc. The expected engine response can include parameters like fueling, EONOx, turbine out temperature, smoke, peak cylinder pressure etc. In examples, the response model can be indicative of engine performance for transient and steady state operation at each operating point for each of the calibrations. Example response models are shown in FIG. 2D, where four reference models were constructed for each of four different calibrations (i.e., Cal 1, Cal 2, Cal 3, Cal 4). The referencing variables used in this case are speed and torque fraction.

As noted above, a performance constraint is set in response to evaluating the response model such that the engine performance deviation data is maintained at a control objective that inhibits deterioration of the engine performance over time. In examples, the engine performance deviation data can be fuel rate deviation data. In this regard, the performance constraint can be a fuel rate constraint. In examples, the engine performance deviation data can be brake specific fuel consumption (BSFC) deviation data. In this regard, the performance constraint can be a BSFC constraint.

Controls objectives can be formulated after the response models are constructed. In examples, the response models can be evaluated to determine an expected baseline engine performance (e.g., a fuel rate or BSFC) and an expected current engine performance (e.g., a fuel rate or BSFC) for all the different calibration options. In examples, the engine performance deviation data can be equal to a change in engine performance divided by the expected baseline engine performance. In this regard, the change in engine performance can be equal to the expected current engine performance minus the expected baseline engine performance. In examples, the controls objective can be either a performance range such that the engine performance is maintained within the performance range or a performance threshold such that the engine performance is maintained within the performance threshold. In examples, the controls objective can be a percentage change in the engine performance deviation data.

Formulating control objects can account for engine performance deterioration (e.g., BSFC or fuel economy loss) as it compares to a baseline engine performance. In addition, this formulation can accommodate program requirements driven by customer satisfaction and emissions (e.g., CO2) regulations. The considerations in the formulation can be expressed using the following algorithm:

$$\int_0^T (\text{Current Engine Performance} - \text{Baseline Engine Performance})dt \leq \delta \int_0^T \text{Baseline Engine Performance}.$$

Over a cycle of time duration, 'T,' this algorithm compares the current system's engine performance with the baseline system's engine performance and keeps that difference to within a control objective, 'δ.' The left-hand side of the algorithm represents engine performance deviation, such the accumulated fuel error over a past fueling history. This represents the deviation of the actual engine performance from the baseline performance over a given time.

One example of formulating control objectives involves solving the above equation for delta. In this regard, as noted above, the control objective can be a percentage change in engine performance as shown in the following algorithm:

$$\frac{\int_0^T \text{Engine Performance Deviation } dt}{\int_0^T \text{Baseline Engine Performance } dt} \leq \delta.$$

The left-hand side of the equation can be calculated in real time. A controller (e.g., an ECU of proportional-integral-derivative (PID) controller) can be used to monitor various signals indicative of the engine performance to calculate the left-hand side of the equation as it relates to the control objective δ. Methods such as the method 200 can employ these aspects of the disclosure. The performance constraint (e.g., at step 205) can be sent to a supervisory control structure (detailed of which are further discussed below). As detailed further below with respect to FIG. 3, the supervisory control structure can include the performance constraint in addition to other constraints such as system out NOx, smoke, turbine out temperatures, etc. Analyzing these constraints, the supervisory controller can determine the optimum engine fuel system and air handling references with which to operate the engine.

Figure 2E:
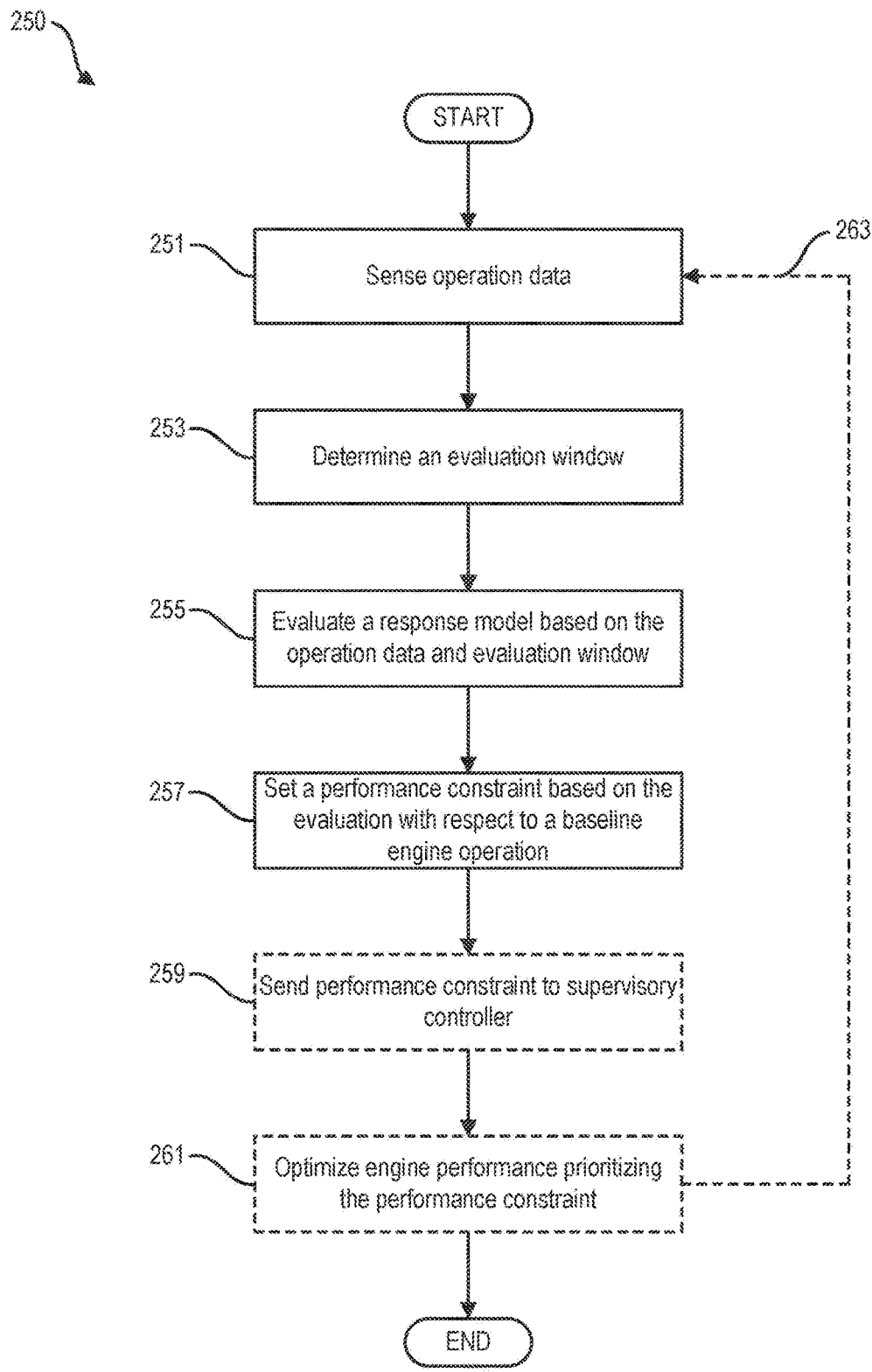
FIG. 2E is a flowchart of a method for determining engine performance of an engine according to aspects of the present disclosure.

Another example of formulating control objectives involves approximating the above integrals by a first order filter. Methods employing this principle can be useful for determining engine performance (e.g., fuel economy, BSFC, etc.) for a given engine operation (e.g., speed and load demands), an example of which is shown in FIG. 2E. The estimates provided by evaluating the response model for a baseline engine-aftertreatment system can be used to develop a window-based average of the estimates. The time constant of the filter is determined to closely match the integral metric. At step 251, the method 250 can include sensing operation data indicative of an engine (e.g., engine 102, FIGS. 1A, 1B) response during a current engine operation. At step 253, the method 250 can include determining an evaluation window comprising a length of time over which the engine performance is to be evaluated. At step 255, the method 250 can include evaluating a response model to determine a current engine performance at the current engine operation. In examples, this evaluation can be performed via a controller (e.g., PID controller, ECU, etc.). In examples, this evaluation can be used to generate a performance constraint. In examples, this evaluation can be based on each of the operation data and the evaluation window. At step 257, the method 250 can include setting a performance constraint in response to evaluating the response model. The performance constraint can be set with respect to the baseline engine operation. In examples, the performance constraint can be set such that the current engine performance is maintained at a controls objective that inhibits reduced engine performance. In examples, the current engine performance can correspond to fuel economy, and wherein the performance constraint is a fuel economy constraint.

Several criteria can be considered and/or used in the selection of window with which to evaluate the above integral. For instance, regulatory requirements and cycles can determine a length over which the evaluation window over which the averaging is performed. In examples, the evaluation window can have an upper limit and a lower limit. The upper limit can be defined by the regulatory requirements and cycles. The lower limit can generate a constraint that does not change across singular modes of steady state regulatory cycles (e.g., ramped modal cycles (RMC), World Harmonized Stationary Cycles (WHSC), etc.). In this regard, at least one of the upper and lower limits can be based on one or more of regulatory requirements and regulatory cycles. The window length is tuned keeping these two criteria in mind.

Disclosed methods can include modifying the evaluation window for certain operating conditions such that the evaluation window is adjustable. In examples, at step 253, the length of time of the evaluation window can be adjustable over time based on engine operating conditions. In examples, the length of time of the evaluation window is made longer than a nominal length when the engine operating conditions include low fueling regions on an engine torque curve. In examples, the length of time of the evaluation window is made shorter than the nominal length when the engine operating conditions include high fueling regions on the engine torque curve. In this regard, the window length can be made very large for low fueling regions such as idle, and conversely, can be made smaller for high fueling regions on the engine torque curve. Other adjustments will be apparent to those skilled in the art in light of this disclosure and therefore should not be considered outside the scope of the disclosure.

In examples, some steps of the method 250 are optional as exhibited by the dashed line and can include optional feedback loops to repeat certain steps (e.g., for optimization and/or monitoring) where desired. The figure is not intended to limit the disclosure to the example illustrated therein. At step 259, the method 250 can include sending the performance constraint to a supervisory control structure that is configured to determine optimized fuel system and air handling references based at least on the performance constraint. At step 261, the method 250 can include comprising optimizing the engine performance prioritizing the performance constraint. A feedback loop 263 is also contemplated. These steps are further discussed below with respect to FIG. 3.

Figure 3:
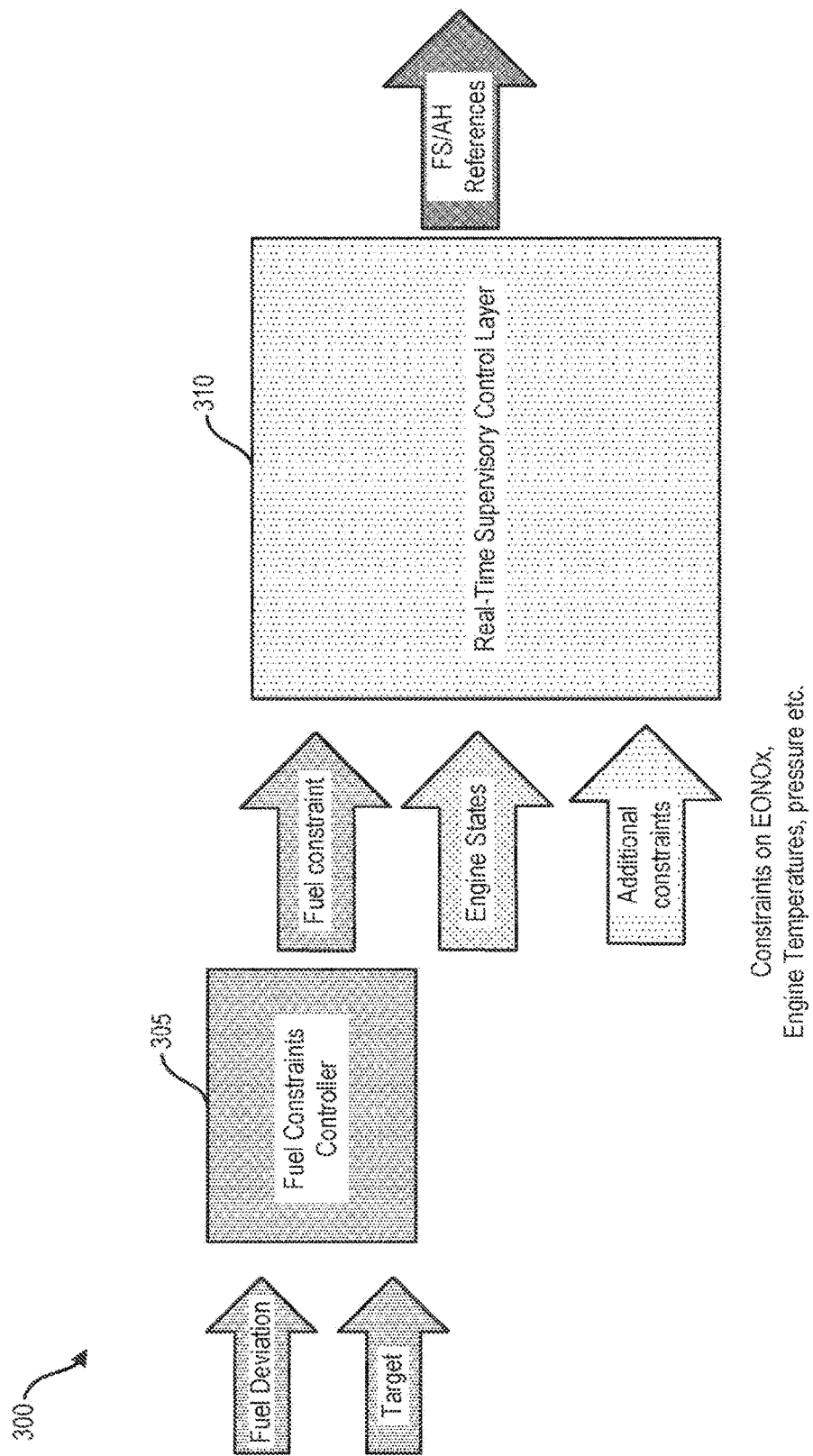
FIG. 3 is a diagram showing a supervisory control according to aspects of the present disclosure.

FIG. 3 illustrates a diagram showing a supervisory control system 300 according to aspects of the present disclosure. As shown here, the diagram is specific to a fuel constraint controller 305 but should not be read so as to limit the disclosure to this example. To begin, fuel deviations and target control objective (e.g., 'δ') can be inputs to a fuel constraint controller 305. This controller 305 can evaluate response models to determine performance constraints (e.g., fuel constraints) which then form inputs to the supervisory controller 310. Other factors such as engine states and other constraints (e.g., on EONOx, engine temperatures, pressures, etc.) can also be inputs for the supervisory controller 310. These steps can result in fuel system and air handling references that can be used by the engine. More details about the supervisory control are discussed below.

As alluded to above, disclosed devices, systems, and methods can involve a supervisory control structure and a supervisory controller 310 configured to implement the supervisory control structure. In examples, methods can include sending performance constraints (e.g., those discussed above with relation to FIGS. 2A-2E) to a supervisory control structure. The supervisory control structure can be configured to determine optimized fuel system and air handling references based at least on the performance constraint. Under these circumstances, the supervisory controller 310 can evaluate several different constraints based on engine and aftertreatment conditions. These constraints can include EONOx constraints, O2 constraints, turbine outlet temperature constraints, smoke constraints, peak cylinder pressure constraints, etc. The supervisory controller 310 typically can have an assigned priority of constraints. In examples, the supervisory controller 310 can optimize the engine performance prioritizing the performance constraint. In this regard, the performance constraint (e.g., for fuel or BSFC) can have the highest priority for systems where engine performance deviation needs to be controlled from the baseline operation. The supervisory controller 310 can use a real-time optimization scheme based on the fuel constraint and all other constraints, as well as response models to determine the optimal fuel system and air handling references (e.g., rail pressure, SOI timing, EGR fraction, VGT position, etc.). The supervisory controller 310 can manage both NOx and fuel economy performance, and can optionally adjust priorities so that either one takes precedence.

In general, examples disclosed herein can include a non-transitory computer readable medium. The non-transitory computer readable medium may have computer readable program code stored thereon. The computer readable program code can include one or more program instructions that, when executed by a processor (e.g., the ECU and/or a PID controller), cause the processor to perform any function of the embodiments disclosed herein. For example, the non-transitory computer readable medium may include one or more program code instructions that, when executed by a processor, cause the processor to perform functions similar to the methods 200 and 250 discussed above. In some embodiments, the processor can be included in a vehicle (e.g., vehicle 10, FIG. 1A) as a part of a supervisory control structure executed by a supervisory controller similar to supervisory controller 310.

It is well understood that methods that include one or more steps, the order listed is not a limitation of the claim unless there are explicit or implicit statements to the contrary in the specification or claim itself. It is also well settled that the illustrated methods are just some examples of many examples disclosed, and certain steps can be added or omitted without departing from the scope of this disclosure. Such steps can include incorporating devices, systems, or methods or components thereof as well as what is well understood, routine, and conventional in the art.

The connecting lines shown in the various figures contained herein are intended to represent exemplary functional relationships and/or physical couplings between the various elements. It should be noted that many alternative or additional functional relationships or physical connections can be present in a practical system. However, the benefits, advantages, solutions to problems, and any elements that can cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an embodiment, B alone can be present in an embodiment, C alone can be present in an embodiment, or that any combination of the elements A, B or C can be present in a single embodiment; for example, A and B, A and C, B and C, or A and B and C.

In the detailed description herein, references to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus While the present disclosure has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A method of balancing engine performance and engine emissions of an engine in a vehicle in real time, the method comprising:
    sensing operation data indicative of an engine response during a current engine operation that includes a supervisory control of engine emissions;
    evaluating, using a controller and based on the operation data, a response model to determine engine performance deviation data corresponding to an expected baseline engine performance and an expected current engine performance at the current engine operation; and
    setting a performance constraint in response to evaluating the model, the performance constraint being set such that the engine performance deviation data is maintained at a controls objective that inhibits deterioration of the engine performance over time;
    wherein the engine performance deviation data is brake specific fuel consumption (BSFC) deviation data, and wherein the performance constraint is a BSFC constraint.

2. The method of claim 1, wherein the engine performance deviation data is fuel rate deviation data, and wherein the performance constraint is a fuel rate constraint.

3. The method of claim 1, wherein the controls objective is either a performance range such that the engine performance is maintained within the performance range or a performance threshold such that the engine performance is maintained within the performance threshold.

4. A method of balancing engine performance and engine emissions of an engine in a vehicle in real time, the method comprising:
    sensing operation data indicative of an engine response during a current engine operation that includes a supervisory control of engine emissions;
    evaluating, using a controller and based on the operation data, a response model to determine engine performance deviation data corresponding to an expected baseline engine performance and an expected current engine performance at the current engine operation; and
    setting a performance constraint in response to evaluating the model, the performance constraint being set such that the engine performance deviation data is maintained at a controls objective that inhibits deterioration of the engine performance over time;
    wherein the supervisory control is based on operating points along a fuel-emissions tradeoff curve that includes calibrations for a low emissions operating point, a baseline operating point, and a best fueling operating point; and wherein the operating points correspond to a set of rail pressure and air handling references for the engine.

5. The method of claim 4, wherein the response model is indicative of engine performance for transient and steady state operation at each operating point for each of the calibrations; and wherein the controller is configured to interpolate additional operating points between at least two of the calibrations.

6. A method of balancing engine performance and engine emissions of an engine in a vehicle in real time, the method comprising:
    sensing operation data indicative of an engine response during a current engine operation that includes a supervisory control of engine emissions;
    evaluating, using a controller and based on the operation data, a response model to determine engine performance deviation data corresponding to an expected baseline engine performance and an expected current engine performance at the current engine operation; and
    setting a performance constraint in response to evaluating the model, the performance constraint being set such that the engine performance deviation data is maintained at a controls objective that inhibits deterioration of the engine performance over time;
    wherein the engine performance deviation data is equal to a change in engine performance divided by the expected baseline engine performance; and wherein the change in engine performance is equal to the expected current engine performance minus the expected baseline engine performance.

7. The method of claim 6, wherein the controls objective is a percentage change in the engine performance deviation data.

8. The method of claim 1, further comprising sending the performance constraint to a supervisory control structure that is configured to determine optimized fuel system and air handling references based at least on the performance constraint.

9. The method of claim 8, further comprising optimizing the engine performance prioritizing the performance constraint.

10. A method of determining an engine performance of an engine in a vehicle, the method comprising:
    sensing operation data indicative of an engine response during a current engine operation;
    determining an evaluation window comprising a length of time over which the engine performance is to be evaluated;
    evaluating, using a controller and based on each of the operation data and the evaluation window, a response model to determine a current engine performance at the current engine operation; and
    setting a performance constraint in response to evaluating the model, the performance constraint being set such that the current engine performance is maintained at a controls objective that inhibits reduced engine performance;
    wherein the length of the window is adjustable over time based on engine operating conditions;
    wherein the length of the window is made longer than a nominal length when the engine operating conditions include low fueling regions on an engine torque curve; and
    wherein the length of the window is made shorter than the nominal length when the engine operating conditions include high fueling regions on the engine torque curve.

11. A method of determining an engine performance of an engine in a vehicle, the method comprising:
    sensing operation data indicative of an engine response during a current engine operation;

determining an evaluation window comprising a length of time over which the engine performance is to be evaluated;

evaluating, using a controller and based on each of the operation data and the evaluation window, a response model to determine a current engine performance at the current engine operation; and setting a performance constraint in response to evaluating the model, the performance constraint being set such that the current engine performance is maintained at a controls objective that inhibits reduced engine performance;

wherein the evaluation window has an upper limit and a lower limit; wherein at least one of the upper and lower limits is based on one or more of regulatory requirements and regulatory cycles; and wherein the lower limit does not change across singular modes of steady state regulatory cycles.

12. A method of determining an engine performance of an engine in a vehicle, the method comprising:

sensing operation data indicative of an engine response during a current engine operation;

determining an evaluation window comprising a length of time over which the engine performance is to be evaluated;

evaluating, using a controller and based on each of the operation data na the evaluation window, a response model to determine a current engine performance at the current engine operation; and setting a performance constraint in response to evaluating the model, the performance constraint being set such that the current engine performance is maintained at a controls objective that inhibits reduced engine performance;

wherein the current engine performance is fuel economy; wherein the performance constraint is a fuel economy constraint; and wherein the controls objective is either a performance range such that the current engine performance is maintained within the performance range or a performance threshold such that the current engine performance is maintained within the performance threshold.

13. A method of determining an engine performance of an engine in a vehicle, the method comprising:

sensing operation data indicative of an engine response during a current engine operation;

determining an evaluation window comprising a length of time over which the engine performance is to be evaluated;

evaluating, using a controller and based on each of the operation data and the evaluation window, a response model to determine a current engine performance at the current engine operation; and setting a performance constraint in response to evaluating the model, the performance constraint being set such that the current engine performance is maintained at a controls objective that inhibits reduced engine performance;

wherein the engine is under supervisory control for emissions;

wherein the supervisory control is based on operating points along a fuel-emissions tradeoff curve that includes calibrations for a low emissions operating point, a baseline operating point, and a best fueling operating point; and wherein the operating points correspond to a set of rail pressure and air handling references for the engine;

wherein the response model is indicative of engine performance for transient and steady state operation at each operating point for each of the calibrations; and wherein the controller is configured to interpolate additional operating points between at least two of the calibrations.

14. The method of claim 10, further comprising sending the performance constraint to a supervisory control structure that is configured to determine optimized fuel system and air handling references based at least on the performance constraint.

15. A method of managing engine emissions, the method comprising:

sensing operation data indicative of an engine response;

evaluating, based on the operation data, a response model to determine engine performance deviation data corresponding to an expected baseline engine performance and an expected current engine performance at the current engine operation; and setting a first performance constraint in response to evaluating the model, the first performance constraint being set such that the engine performance deviation data is maintained at a controls objective that inhibits deterioration of the engine performance over time;

wherein at least one of:
the engine performance deviation data includes fuel rate deviation data, and the performance constraint includes a fuel rate constraint; and
the engine performance deviation data includes brake specific fuel consumption (BSFC) deviation data, and the performance constraint includes a BSFC constraint.

16. A method of managing engine emissions, the method comprising:

sensing operation data indicative of an engine response;

evaluating, based on the operation data, a response model to determine engine performance deviation data corresponding to an expected baseline engine performance and an expected current engine performance at the current engine operation; and setting a first performance constraint in response to evaluating the model, the first performance constraint being set such that the engine performance deviation data is maintained at a controls objective that inhibits deterioration of the engine performance over time;

wherein the plurality of instructions, when executed by a processor, further cause the processor to:

determining an evaluation window comprising a length of time over which the engine performance is to be evaluated;

evaluating, based on each of the operation data and the evaluation window, a response model to determine a current engine performance at the current engine operation; and setting a second performance constraint in response to evaluating the model, the second performance constraint being set such that the current engine performance is maintained at a controls objective that inhibits reduced engine performance.

17. A method of managing engine emissions, the method comprising:

sensing operation data indicative of an engine response;

evaluating, based on the operation data, a response model to determine engine performance deviation data corresponding to an expected baseline engine performance and an expected current engine performance at the current engine operation; and setting a first performance constraint in response to evaluating the model, the first performance constraint being set such that the engine performance deviation data is maintained at a controls objective that inhibits deterioration of the engine performance over time;
wherein the length of the window is adjustable over time based on engine operating conditions; and wherein the evaluation window has an upper limit and a lower limit; wherein at least one of the upper and lower limits is based on one or more of regulatory requirements and regulatory cycles; and wherein the lower limit does not change across singular modes of steady state regulatory cycles.

* * * * *